United States Patent [19]
Reimann et al.

[11] Patent Number: 6,098,762
[45] Date of Patent: Aug. 8, 2000

[54] BRAKE ACTUATOR

[75] Inventors: Gregor Reimann, Pentling; Karl-Heinz Roess, Ebersbach, both of Germany

[73] Assignee: DaimlerChrysler AG, Stuttgart, Germany

[21] Appl. No.: 09/159,501

[22] Filed: Sep. 23, 1998

[30] Foreign Application Priority Data

Sep. 23, 1997 [DE] Germany .............................. 197 41 867

[51] Int. Cl.⁷ ................................................ F16D 55/228
[52] U.S. Cl. ..................... 188/72.5; 188/72.8; 188/106 P
[58] Field of Search ................................... 188/72.4, 72.1, 188/72.5, 106 P, 106 R, 158, 162, 72.8; 192/83

[56] References Cited

U.S. PATENT DOCUMENTS

| | | | |
|---|---|---|---|
| 4,804,073 | 2/1989 | Taig et al. ................................. | 188/72.1 |
| 4,809,824 | 3/1989 | Fargier et al. ........................... | 188/72.8 |
| 5,500,295 | 3/1996 | Fargier . | |

FOREIGN PATENT DOCUMENTS

| | | |
|---|---|---|
| 0286504 | of 1991 | European Pat. Off. . |
| 4312524 | of 1994 | Germany . |
| 4312524A1 | 10/1994 | Germany . |
| WO 94/24453 | 10/1994 | Germany .............................. 188/72.4 |
| 19519308A1 | 11/1996 | Germany . |
| 19644441 | of 1997 | Germany . |
| 2307525A | 5/1997 | United Kingdom . |

Primary Examiner—Robert J. Oberleitner
Assistant Examiner—Pamela J. Lipka
Attorney, Agent, or Firm—Evenson, McKeown, Edwards & Lanahan, P.L.L.C.

[57] ABSTRACT

A brake actuator includes an electric motor, a conversion device for converting the rotational movement of the electric motor into a linear movement and a hydraulic transmission for transmitting the linear movement of the conversion device to an adjusting piston of a brake. The conversion device includes at least two adjusting elements which can be driven by the electric motor and by way of which the at least two hydraulic pistons of the hydraulic transmission can be operated independently of one another in a hydraulic chamber which can be selectively connected with a reservoir.

16 Claims, 2 Drawing Sheets

BRAKE ACTUATOR

BACKGROUND AND SUMMARY OF THE INVENTION

This application claims the priority of German application 197 41 867.8-21, filed in Germany on Sep. 27, 1997, the disclosure of which is expressly incorporated by reference herein.

The invention relates to a brake actuator, comprising an electric motor, a conversion device for converting the rotational movement of the electric motor into a linear movement, and a hydraulic transmission for transmitting the linear movement of the conversion device to an adjusting piston of a brake.

Increasingly dense road traffic requires systems which, on the one hand, contribute to the driver's safety and, on the other hand, relieve the driver. In the automobile industry, the trend is in the direction of so-called autonomous driving.

In the future, the driver is to be aided by so-called "by-wire systems" and, in many driving situations, is to be relieved by intelligent systems. An important prerequisite of such systems is their electric controllability.

In the case of known brake systems, predominantly hydraulic or pneumatic transmission or booster devices are used by means of which the driver of a vehicle directly defines the brake intervention of a wheel brake. In order to permit, in systems of this type, driver-independent braking interventions, for example, for controlling a ranging, or the like, in addition to the necessary pressure supply by means of a relatively high pressure, high expenditures of components are required, for example, with respect to valves and the like.

For this reason, electrically operable wheel brakes have been known for some time which permit not only a direct controlling of the brake but, particularly compared to hydraulic or pneumatic braking systems, also require significantly fewer component parts.

From German Patent Document 195 19 308 A1, a brake actuator with a transmission is known, for example, which brake actuator has an electric motor as a driving element, a conversion device for converting the rotational movement of the electric motor into a linear movement and a hydraulic transmission for transmitting the linear movement of the conversion device to a friction lining of a brake.

In the case of the hydraulic transmission, this is implemented by means of a conversion device constructed as a spindle in that the spindle nut is frictionally connected with the electric motor and the spindle rod is frictionally connected with a hydraulic piston of the hydraulic transmission and in that, for receiving the spindle stroke, the electric motor is equipped with a hollow shaft. In the case of this brake actuator, the hydraulic piston is arranged in a closed hydraulic chamber.

The advantage of this brake actuator is its compact shape, but it is a problem that, in the case of a self-locking of the transmission, a danger arises for the driver and the environment because the brake would remain in the applied position, which results in an uncontrollable danger situation.

In order to implement, in the case of an electromagnetic wheel brake, different adjusting speeds and application forces of a tensioning device by means of an electric motor, in the case of a wheel brake known from German Patent Document DE 43 12 524 A1, clutches are provided which can be switched electromagnetically. Also in the case of this wheel brake, an adjustment of the brake is achieved by means of a spindle drive. A self-locking of the transmission is also a problem in the case of this brake. Furthermore, such a brake requires a plurality of high-expenditure component parts which are often susceptible to disturbances.

It is therefore an object of the invention to further develop a brake actuator of the above-mentioned type in that, by means of components which are as insusceptible to disturbances as possible, on the one hand, an electrically controllable adjustment of a brake is permitted at different adjusting speeds and application forces, and, on the other hand, a self-locking of the transmission and/or of the conversion device is excluded.

In the case of a brake actuator of the initially mentioned type, this object is achieved according to the invention in that the conversion device comprises at least two adjusting elements which can be driven by the electric motor and by means of which the at least two hydraulic pistons of the hydraulic transmission can be operated independently of one another in a hydraulic chamber which, as required, can be connected with a reservoir.

By means of the at least two mutually independently operable hydraulic pistons of the hydraulic transmission, an adjustment of the brake is advantageously permitted at, on the one hand, different adjusting speeds and, on the other hand, different application forces. As the result of the fact that the hydraulic chamber, in which the hydraulic pistons move, can be connected with a reservoir, as required, at any time, particularly in danger situations which occur, for example, when a self-locking of the adjusting elements occurs and thus also of the hydraulic pistons, a moving back of the adjusting piston and thus an opening of the brake by connecting the hydraulic chamber with the reservoir is permitted.

In this case, when the adjusting piston is moved back, the hydraulic fluid situated in the hydraulic chamber expands into the reservoir.

However, inversely, by means of the connection of the hydraulic chamber with the reservoir, a compensation can also be carried out of a volume increase of the hydraulic chamber which takes place, for example, in the case of a brake disk wear or a brake lining wear.

Purely in principle, many different embodiments are conceivable for connecting the hydraulic chamber with the reservoir.

A particularly advantageous embodiment, which particularly also permits an electric controllability, provides that the hydraulic chamber can be connected with the reservoir by way of a valve which can be controlled independently of the electric motor, and the hydraulic chamber, the valve and the reservoir form a system which is closed with respect to the environment.

By controlling the valve for the connection of the hydraulic chamber with the reservoir independently of the electric motor, on the one hand, the above-described emergency operating function of the brake can be implemented particularly advantageously. Furthermore, by the opening of the controllable valve, in a simple manner, a compensation of the brake disk wear and of the brake lining wear can also be carried out in the above-described fashion. As the result of the fact that the hydraulic chamber, the valve and the reservoir form a system which is closed with respect to the environment and which is preferably provided with a lifelong charge, a "dry" brake actuator is also permitted which is therefore particularly friendly with respect to the environment.

In order to increase the safety of the brake and particularly ensure that, for example, in the event of a failure of the electric motor, an opening of the brake is possible, it is advantageously provided that the electric motor and the valve have two separate electric circuits which can be controlled independently of one another. As a result, it is ensured that, for example, in the event of a failure of the electric circuit for the electric motor, an operating of the valve is nevertheless possible by way of its separate electric circuit.

As far as the construction of the adjusting element is concerned, many different embodiments are also conceivable here.

An embodiment, which technically can be implemented in a particularly simple manner by means of few component parts and is therefore very advantageous, provides that the adjusting elements assigned to the two hydraulic pistons are spindle drives which can be operated by two driving elements which can be driven in a mutually independent manner by the electric motor.

In order to permit particularly an extremely compact construction of the whole brake actuator and thus of the whole wheel brake, it is advantageously provided that the first driving element is a first disk which engages with an external spindle thread of the first hydraulic piston and has a central internal spindle thread and engages with an external toothing in a gear wheel arranged on the motor shaft of the electric motor. This externally toothed disk is therefore part of a step-down gear in the form of a spur gear which transmits a rotation of the motor shaft in a geared-down manner into a spindle drive which, in turn, results in an axial displacement of the first hydraulic piston.

In this case, it is advantageously provided that the second driving element is a second disk which is arranged in parallel to the first disk and which, on a cylindrical projection shaped to it, has an external spindle thread which engages with an internal spindle thread of the second hydraulic piston and can be driven by the first disk by means of a controllable electromagnetic friction clutch.

The construction of the driving elements as a first and second disk particularly permits an extremely compact construction. The controllable electromagnetic friction clutch permits in a simple manner an operation of the second hydraulic piston which is independent of the operation of the first hydraulic piston by means of a single electric motor. For this reason, an additional electric motor or another driving source for operating the second hydraulic piston can be eliminated.

In order to, in particular, also design the bearings of the first and the second disk as compactly as possible, it is provided in an advantageous embodiment that the first and the second disk are freely movably disposed on one another and in each case on one half of a housing accommodating the whole conversion device and the hydraulic transmission or on a guide of the hydraulic piston. As a result, the number of parts of the brake actuator is also significantly reduced because, on the one hand, the housing and, on the other hand, the guide of the hydraulic pistons are a component of the bearings so that additional bearing elements are not necessary.

Other objects, advantages and novel features of the present invention will become apparent from the following detailed description of the invention when considered in conjunction with the accompanying drawings.

DETAILED DESCRIPTION OF THE DRAWINGS

Figure 1:
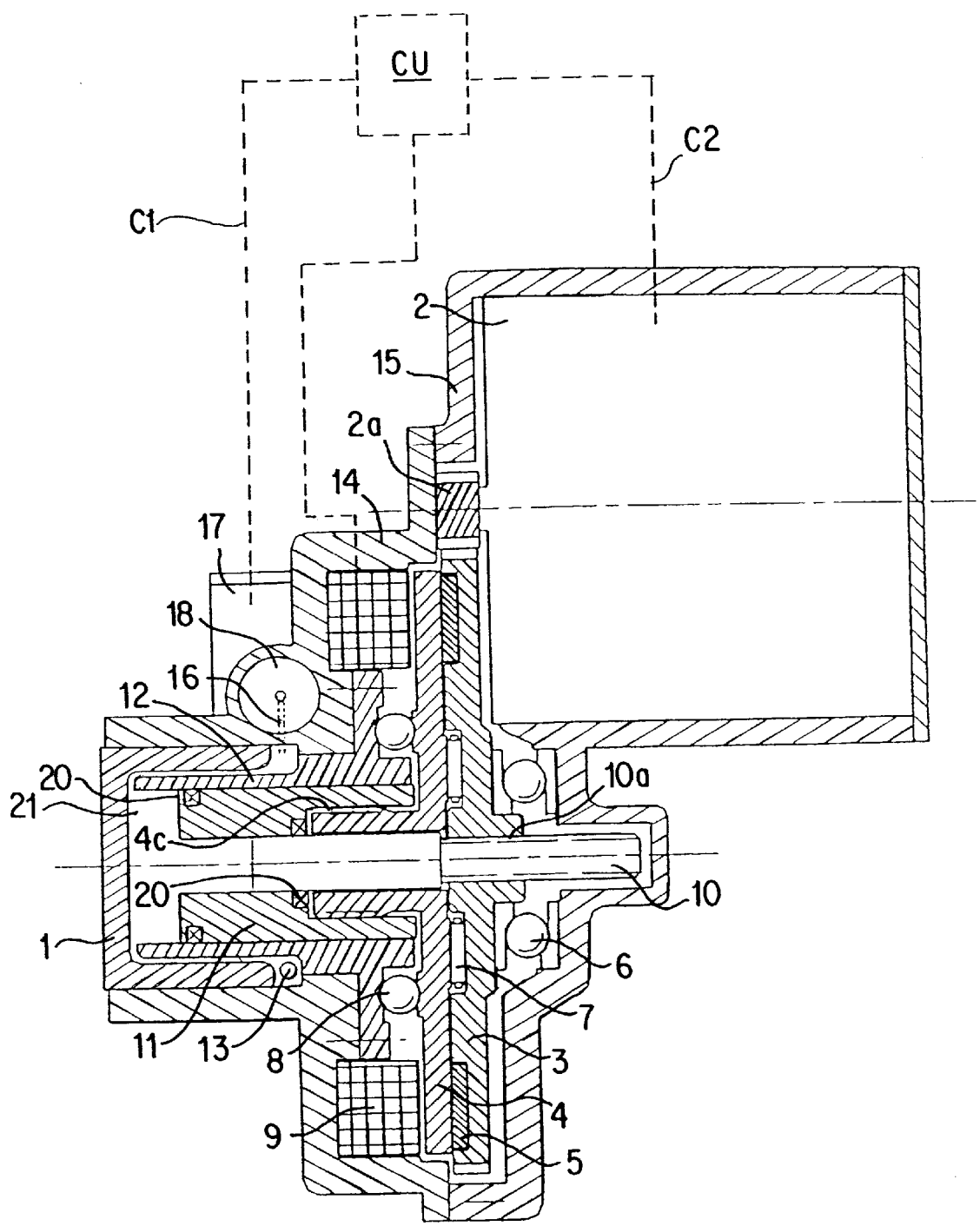
FIG. 1 is a sectional view of an embodiment of a brake actuator according to the invention.

An actuator for a wheel brake of a motor vehicle illustrated in FIG. 1 comprises a housing formed of two housing halves 14, 15, on whose one half 15 an electric motor 2 is fastened to a flange.

In the housing 14, 15, a conversion device is provided which has two driving elements in the form of two disks 3, 4 which are arranged in parallel to one another and which can be driven by the electric motor 2. The first disk 3 has an external toothing by means of which it engages in a gearwheel 2a arranged on the motor shaft of the electric motor 2. Thus, the gearwheel 2a and the first disk 3 form a step-down gear in the form of a spur gear. The first disk 3 also has a centrally arranged axial internal spindle thread which engages with an external spindle thread 10a of a piston 10. The internal spindle thread arranged on the first disk 3 and the external spindle thread 10a of the piston 10 together form a first adjusting element in the form of a spindle drive by means of which a rotating movement of the disk 3 is converted into an axial displacement of the first piston 10.

The second disk 4, which is rotationally movably disposed in parallel to the first disk 3 on this first disk has, on a cylindrical shaped-on section, an external spindle thread 4a which engages in an internal spindle thread of another second piston 11 so that a rotating movement of the second disk 4 results in an axial displacement of the second piston 11. The external spindle thread 4a and the internal spindle thread of the second piston 11 together form another second adjusting element in the form of a spindle drive.

Close to the circumference of the second disk 4, at least one, for example, ring-shaped solenoid 9 is provided which, establishes a frictional connection between the first disk 3 and the second disk 4, when acted upon by a current, by way of a clutch element 5. The electromagnetic friction clutch 9, 5 can be controlled by a schematically shown control unit CU so that, as required, the second disk 4 can be taken along by the first disk 3, whereby an axial displacement of the second piston 11 is possible by means of the second disk 4 and its spindle drive independently of an axial displacement of the first piston 10 by means of the electric motor 2.

As illustrated in FIG. 1, the first disk 3 is disposed on one housing half 15 by means of a bearing 6, such as a ball bearing; whereas the second disk 4 is disposed on a piston guide 12 by means of a bearing 8, for example, also a ball bearing. In this manner, an extremely compact construction of as few component parts as possible is achieved.

Between the piston 11 and the piston guide 12 as well as between the piston 11 and the piston 10, respective sealing devices 20 are provided which permit a tight sliding displacement of the two pistons 10, 11 in one another as well as of the piston 11 in the piston guide 12.

Figure 2:
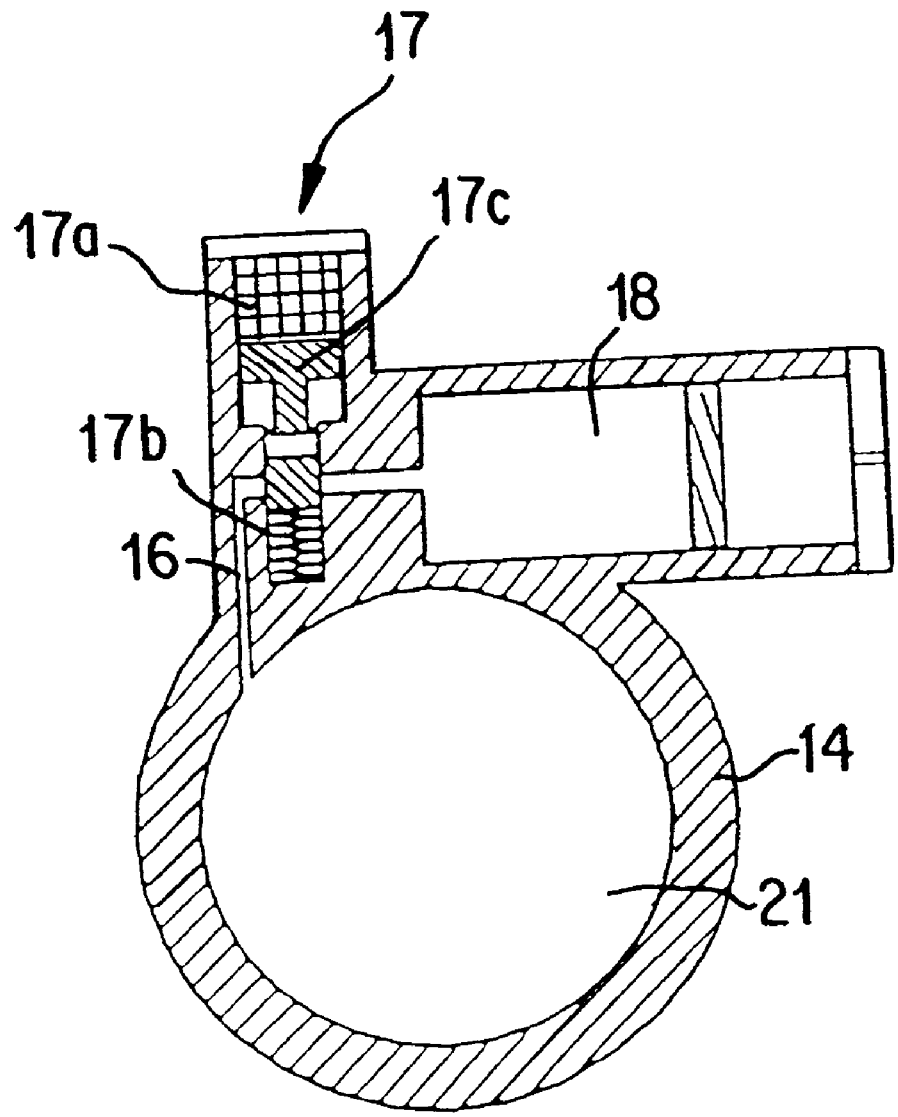
FIG. 2 is a schematic and partially broken-away sectional view of a reservoir for hydraulic fluid of the brake actuator illustrated in FIG. 1 which can be connected by means of a valve.

As illustrated in FIG. 1 and particularly in FIG. 2, a reservoir 18 is arranged on one housing half 14 which is filled with a hydraulic fluid. It should be stressed that this filling is a life-time charge so that an exchange of the hydraulic fluid is not required and a "dry" actuator is therefore achieved which is therefore extremely friendly with respect to the environment.

The reservoir 18 is connected with a hydraulic chamber 21 in which the two pistons 10, 11 are axially displaceable, by way of a duct 16 and can be opened and closed by an electromagnetically operated valve 17. As illustrated in FIG. 2, the valve body 17c can be operated by means of a solenoid 17a against the restoring force of a restoring spring 17b.

The valve 17 and the electric motor 2 have mutually separately controllable electric circuits (schematically shown at C1 and C2 as connected with the control unit CU) so that, also in the event of a failure of the motor 2, an operation of the valve 17 is still possible. This is required, for example, if the motor 2 fails in a condition in which the brake actuator is operated and the wheel brake is in a braking engagement although the electric motor 2 is already supplied with signals for returning the pistons 10, 11. In this case, the reservoir 18 is opened up by the valve 17, and the hydraulic fluid situated in the hydraulic chamber 21 expands back into the reservoir 18, whereby a restoring takes place of the adjusting piston 1 designed as a secondary piston.

In addition, an operation of the valve 17 takes place for compensating brake disk wear and brake lining wear. By the opening of the valve 17 and a resulting flowing of the hydraulic fluid from the reservoir 18 into the hydraulic chamber 21, the volume of the hydraulic chamber 21, which is enlarged because of the wear, is filled with hydraulic fluid.

Summarizing, the above-explained brake actuator permits not only a high efficiency because of the spur gear stage between the electric motor 2 and the disk 3, which directly operates a first hydraulic piston 10 by way of a spindle drive, as well as an operation of the second hydraulic piston 11, which, as required, is independent of the operation of the first hydraulic piston 10, by way of a second disk 4 which can be taken along by the first disk 3 by way of an electromagnetically controllable friction clutch 9, 5, and by way of a spindle drive assigned to the second disk 4, but also an operation of the adjusting piston 1 which is independent of the operation by the electric motor 2, by the controlled opening of the valve 17 and therefore an enlargement of the volume of the hydraulic chamber 21 by connecting the reservoir 18 to the hydraulic chamber 21. As a result, not only wear phenomena of the brake can be compensated but an emergency operating function of the brake actuator is also permitted.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Brake actuator, comprising:
   an electric motor,
   a conversion device for converting rotational movement of the electric motor into a linear movement, and
   a hydraulic transmission for transmitting the linear movement of the conversion device to an adjusting piston of a brake,
   wherein the conversion device has at least two adjusting elements which can be driven by the electric motor and by means of which at least two hydraulic pistons of the hydraulic transmission can be operated independently of one another in a hydraulic chamber which can be selectively connected with a reservoir.

2. Brake actuator according to claim 1, wherein the hydraulic chamber can be connected with the reservoir by way of a valve which can be controlled independently of the electric motor, and
   wherein the hydraulic chamber, the valve and the reservoir form a system which is closed with respect to the environment.

3. Brake actuator according to claim 2, wherein the electric motor and the valve have two separate electric circuits which can be controlled independently of one another.

4. A brake actuator assembly according to claim 2, wherein the hydraulic chamber can be connected with the reservoir by way of a valve which can be controlled independently of the electric motor, and
   wherein the hydraulic chamber, the valve and the reservoir form a system which is closed with respect to the environment.

5. A brake actuator assembly according to claim 4, wherein the electric motor and the valve have two separate electric circuits which can be controlled independently of one another.

6. Brake actuator according to one of claim 1, wherein the adjusting elements assigned to the two hydraulic pistons are spindle drives which can be operated by first and second driving elements which can be driven independently of one another by the electric motor.

7. Brake actuator according to claim 6, wherein the two hydraulic pistons and their spindle drives are nested in one another.

8. Brake actuator according to claim 7, wherein the first driving element is a first disk which engages with an external spindle thread of the first hydraulic piston, has a central internal spindle thread and engages with an external toothing in a gearwheel arranged on the motor shaft of the electric motor.

9. Brake actuator according to claim 8, wherein the second driving element is a second disk which is arranged in parallel to the first disk and which has a cylindrical projection with an external spindle thread which engages with an internal spindle thread of the second hydraulic piston, and can be taken along by the first disk by a controllable electromagnetic friction clutch.

10. Brake actuator according to claim 9, wherein the first and the second disk are rotationally movably disposed on one another and in each case on one half of a housing accommodating the whole conversion device and the hydraulic transmission, or on a guide of the hydraulic pistons.

11. Brake actuator according to claim 6, wherein the first driving element is a first disk which engages with an external spindle thread of the first hydraulic piston, has a central internal spindle thread and engages with an external toothing in a gearwheel arranged on the motor shaft of the electric motor.

12. Brake actuator according to claim 11, wherein the second driving element is a second disk which is arranged in parallel to the first disk and which has a cylindrical projection with an external spindle thread which engages with an internal spindle thread of the second hydraulic piston, and can be taken along by the first disk by a controllable electromagnetic friction clutch.

13. Brake actuator according to claim 12, wherein the first and the second disk are rotationally movably disposed on one another and in each case on one half of a housing accommodating the whole conversion device and the hydraulic transmission, or on a guide of the hydraulic pistons.

14. Brake actuator assembly comprising:
   an electric motor,
   a brake adjusting piston, and a conversion device operable to convert rotational movement of the motor into linear movement of the brake adjusting piston, said conversion device including:
a hydraulic chamber operable on the brake adjusting piston,
first and second hydraulic pistons bounding the hydraulic chamber,
a first driving assembly interposed between the electric motor and the first hydraulic piston to move the first hydraulic piston in response to rotational movement of the motor,
a second driving assembly interposed between the electric motor and the second hydraulic piston to move the second hydraulic piston in response to rotational movement of the motor,
and a control valve selectively connecting the hydraulic chamber to a hydraulic reservoir.

15. A brake actuator assembly according to claim 14, comprising a housing, wherein said brake adjusting piston is slidably disposed in the housing.

16. A brake actuator assembly according to claim 15, wherein said first and second pistons are concentrically arranged in the housing.

* * * * *